June 13, 1961 L. P. GROBEL 2,988,656
METHOD AND APPARATUS FOR EXPLOSION PROTECTION
FOR HYDROGEN-COOLED GENERATORS
Filed Dec. 18, 1959
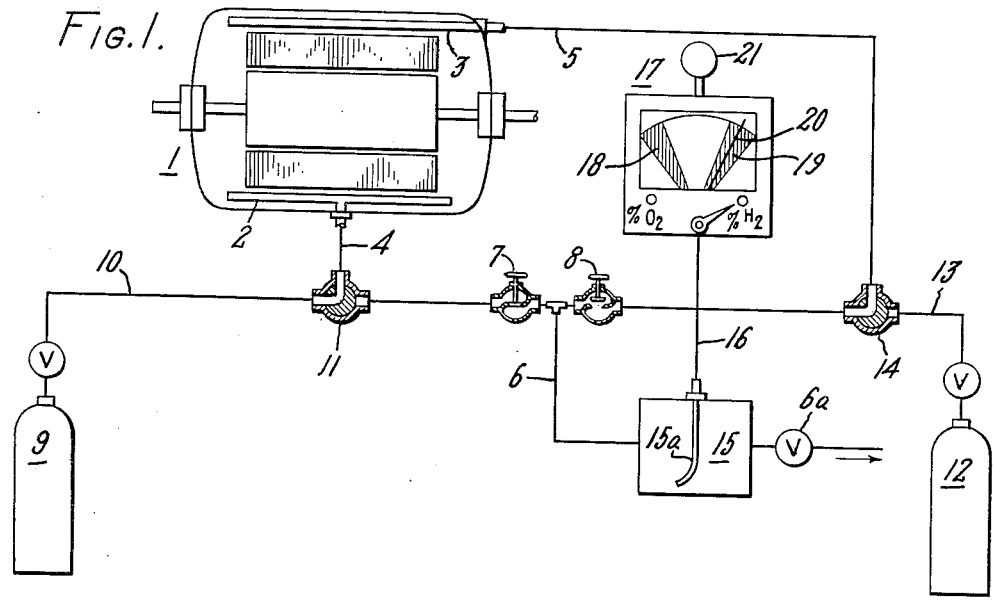
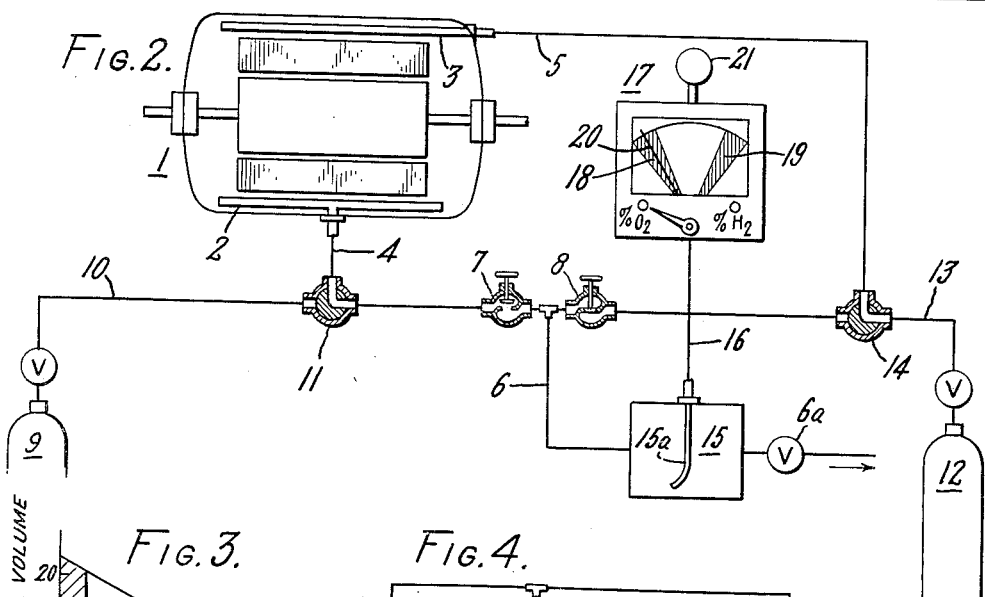
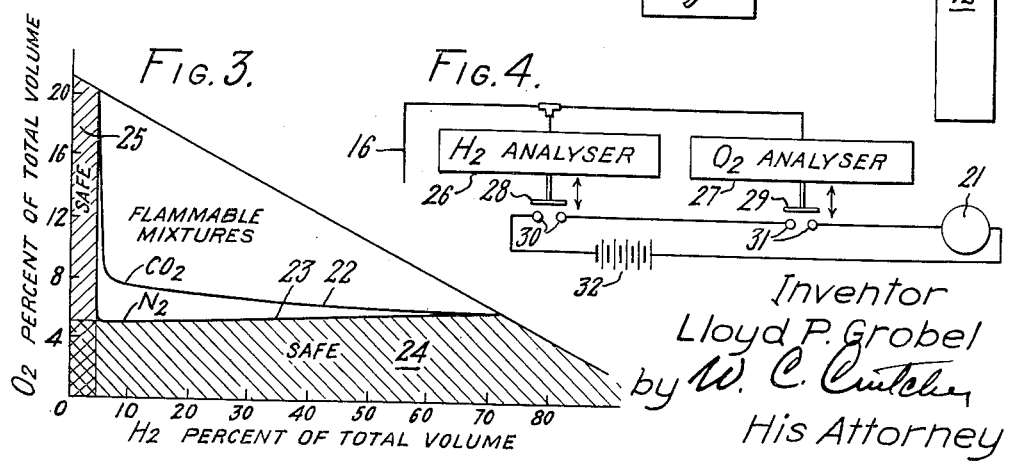
Inventor
Lloyd P. Grobel
by W. C. Crutcher
His Attorney

United States Patent Office 2,988,656
Patented June 13, 1961

2,988,656
METHOD AND APPARATUS FOR EXPLOSION PROTECTION FOR HYDROGEN-COOLED GENERATORS
Lloyd P. Grobel, Schenectady, N.Y., assignor to General Electric Company, a corporation of New York
Filed Dec. 18, 1959, Ser. No. 860,470
11 Claims. (Cl. 310—53)

This invention relates to a system for filling or purging hydrogen-cooled generators or similar electrical apparatus, and more specifically it relates to a system adapted to give an indication of presence of an explosive mixture at the time when the cooling gas is being changed.

Hydrogen has been extensively employed as a cooling medium inside large generators, since its low density reduces the "windage" losses. The sealed casing is generally filled with hydrogen under pressure, where it is circulated by appropriate fan means to cool the windings. Extreme care must be exercised in handling, however, since certain mixtures of hydrogen and oxygen are violently explosive. Various arrangements have been suggested for "monitoring" the gas while the generator is operating, such as by measuring the percentage of oxygen in the atmosphere within the generator.

The greatest possibility of human error or inadequacy of the foregoing type of monitoring system comes when the gas is being changed in the generator. Commonly, an inert gas such as carbon dioxide or nitrogen is employed as an intermediary when filling or purging the generator to minimize the possibility of explosive mixtures.

Moreover, most previously used monitoring systems are particularly concerned with measuring and detecting the extent to which oxygen has entered into the hydrogen-filled generator or the extent to which hydrogen has escaped therefrom while the generator is operating. However, danger also exists if hydrogen above a certain percentage is admitted to a generator which contains sufficient air to form an explosive mixture.

Accordingly, one object of the present invention is to minimize the possibility of accidentally generating flammable or explosive mixtures during the changing of the gas in hydrogen-cooled electric apparatus.

Another object is to provide an improved protective system indicating dangerous mixtures when either a preponderance of hydrogen or a preponderance of some other combustion-supporting gas is in the machine.

Still another object is to provide a protective device for indicating the presence of hydrogen to a dangerous degree in a machine containing a combustion-supporting gas.

Another object is to provide a protective device which effectively detects a dangerous mixture of hydrogen and oxygen either during purging hydrogen from, or addition of hydrogen to, a gas-filled generator.

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a schematic diagram of the explosion protection system as it appears when hydrogen is being removed from the generator with an inert gas, or when air is being removed with the inert gas;

FIG. 2 is a schematic diagram of the same protection system when the generator is being filled with hydrogen;

FIG. 3 is a graph indicating the flammable and non-flammable zones of mixtures of air, hydrogen, carbon dioxide, and nitrogen; and FIG. 4 is a schematic illustration of a modification of the invention.

Generally stated, the invention is practiced by providing means to test both of the percentages of hydrogen and oxygen in the exhaust line of the generator gas filling system. The presence of more than a specified percentage of hydrogen when air and inert gas are predominant or the presence of more than a given percentage of oxygen when hydrogen and inert gas are predominant causes an indication of danger to be given.

Referring to the schematic drawing in FIG. 1, a generator 1 is provided with a purging gas distribution tube 2 and a hydrogen distribution tube 3. The generator may conveniently be of the type which utilizes hydrogen for cooling the "direct-cooled coils" in the rotor as circulated by fans attached to the rotor. The stator coils may also be of the "direct-cooled" type and arranged to be furnished with a cooling liquid which is circulated by external pumps to remove heat from the windings. The details for circulating, cooling, and filtering the heat exchanging fluids used, whether they be liquid or gaseous, do not form a part of the present invention. It is to be understood that suitable means are provided for circulating the coolants as disclosed, for example, in U.S. Patent 2,695,368, issued on November 23, 1954 to C. E. Kilbourne and assigned to the same assignee as the present application.

Other suitable means are provided in generator 1 for detecting the presence of hydrogen in the circulating liquid coolant, if a liquid-cooled stator is used, since this represents one way in which the hydrogen might escape during normal operation of the generator. Such a system is fully disclosed in my U.S. Patent 2,675,493, issued on April 13, 1954 and assigned to the same assignee as the present application. The details of the circulating and liquid detection system are not shown, therefore, since they would only tend to obscure the present invention. The purging gas distribution tube 2 is applied by conduit 4 passing through the gas-tight generator casing and likewise the hydrogen distribution tube 3 is connected to conduit 5 which also passes through the casing. As will be appreciated by those skilled in the art, the hydrogen distribution tube 3 is located close to the top of the generator while the inert gas purging distribution tube 2 is located in the bottom of the generator to insure that the less dense hydrogen gas will be completely removed during purging. Conduits 4, 5 are arranged to feed into a common vent line 6 having a shutoff valve 6a as controlled by manually operated valves 7, 8 respectively.

A source of an inert purging gas 9 such as carbon dioxide or nitrogen is connected by means of a supply line 10 and a three-way valve 11 to the conduit 4. Rotation of the valve 11 allows conduit 4 to communicate either with supply line 10 or to discharge to the common vent line 6 in a manner which will be obvious from the drawing.

Similarly, a source of hydrogen 12 is connected to the conduit 5 by means of a supply line 13 and three-way valve 14. A gas sampling chamber 15 containing a probe 15a is interposed in the common vent line 6. The probe 15a is connected with a gas analyzer 17 by a conduit 16.

The details of the inner mechanism of gas analyzer 17 are omitted, since such an analyzer may be obtained commercially. For example, a suitable oxygen analyzer can be obtained from the Beckman Company, Scientific and Process Instruments Division, Model F-3. The hydrogen analyzer can be General Electric Company Catalog No. 117D837G1. These are both depicted by a single analyzer 17. The analyzer 17 is of the type which indicates the percentage of a selected gas in a mixture of gases and as shown here is arranged to indicate either the percent of oxygen in the mixture issuing from the common vent line 6 or the percent of hydrogen in the mixture. The dial may be conveniently marked to indicate a zone 18 consisting of a safe percentage of oxygen between limits as discussed hereinafter and a zone 19 which represents a safe percentage of hydrogen. When the machine is set to indicate percentage hydrogen, the needle 20 registers the percent hydrogen on the right-hand side of the scale, whereas when set to oxygen, the needle indicates the percent oxygen on the left-hand side of the scale. An alarm indicator 21 such as a bell or signal light is connected to gas analyzer 17 to give a warning signal when the mixture is unacceptable.

A clearer understanding of the functioning of the explosion protection system may be had by reference to FIG. 3 of the drawing showing the abscissa to be graduated as percent of hydrogen by volume in the total mixture and the ordinate calibrated as percent oxygen in the total mixture. A $CO_2$ dividing line 22 separates the graph into two portions, the portion lying above and to the right representing flammable or explosive mixtures of hydrogen and oxygen and the portion below and to the left indicating "safe" or non-flammable mixtures. Thus for any selected percentage of hydrogen and oxygen, the remaining gas in the mixture being carbon dioxide, it is possible to ascertain whether or not the mixture is flammable.

Similarly, the $N_2$ line 23 separates the area of the graph into two slightly different areas which indicate the flammable and "safe" zones, when the oxygen and hydrogen percentage is determined and the remaining gas in the mixture is nitrogen.

Due to the peculiar L shape of the curves, it will be appreciated that a "safe" mixture occurs in every case when the percentage of oxygen is below approximately 5%, this zone being roughly rectangular and extending across the bottom of the graph and designated generally as 24. Also, it will be appreciated that another rectangular "safe" zone 25 results for mixtures containing less than approximately 4% hydrogen, this zone extending vertically to the left of the lines 22, 23. Although the "safe" zones 24, 25 overlap adjacent the origin of the graph, it will be seen that "safe" mixtures result in every case either when the percent oxygen is less than approximately 5% or when the hydrogen content is less than approximately 4%. It will be seen that when carbon dioxide is the inert gas and line 22 controls, the "safe" percentage of oxygen can be raised from 5% to approximately 6%, but 5% is a suitable figure for either inert gas.

Naturally, the "margin of safety" provided by the system can be increased by reducing the "safe" oxygen percentage below 5% or by reducing the "safe" hydrogen percentage below 4%, and it is understood that when these figures are used for purpose of illustration, they include reasonable variations therefrom.

FIG. 4 illustrates a modification of the invention in which the hydrogen and oxygen analyzers function simultaneously to provide continuous monitoring. There separate analyzers including a hydrogen analyzer 26 and an oxygen analyzer 27 are supplied with a sample of gas issuing from the casing by means of the conduit 16 which leads to the sampling chamber 15 (not shown). The generator and the piping system are also not shown in FIG. 4, since they are the same as in FIGS. 1 and 2. Analyzers 26, 27 are shown schematically as operating relay armatures 28, 29 for closing contacts 30, 31 respectively. Relay armatures 28, 29 are arranged to move downward when the percentage of gas for which the analyzer is set exceeds the permissible value. As in the previous example, armature 28 of the hydrogen analyzer 26 would move downward when a percentage of hydrogen by volume on the order of 4% is exceeded. Armature 29, similarly, would move down when a percentage of oxygen on the order of 5% was exceeded. Contacts 30, 31 are connected in series with a source of electricity 32 to actuate alarm 21 when both contacts are closed as will be obvious from the drawing.

The operation of my improved explosion protection system as illustrated in FIGS. 1 and 2 will now be outlined. Prior to introducing hydrogen into the generator, an inert gas is introduced to remove the air, thus removing all or nearly all of the combustion supporting oxygen from the generator. Carbon dioxide is commonly employed for this purpose, due to its relatively low expense and ready availability. During purging of the air, the analyzer 17 is set to test for hydrogen as shown in FIG. 1. Since there was air in the generator at the commencement of this process, the presence of more than approximately 4% hydrogen would constitute an explosive mixture causing alarm 21 to sound. As long as the mixture is within safe limits, while purging proceeds, the indicator arrow 20 will lie within the 0–4% zone 19 on analyzer 17. The three-way valves 11, 14 are set as shown so there is free communication from the $CO_2$ supply 9 to generator 1 by way of valve 11 and conduit 4, and so that there is free communication from generator 1 to the vent line 6 by way of conduit 5, valve 14, and valve 8. Valve 7 is closed in order to prevent any possibility of cross-leakage which might lead to an explosive condition. The probe 15a collects a sample of the gas as it passes through the sampling chamber 15 and the sample is transmitted to the gas analyzer 17.

When air removal is felt to be completed, and the generator is filled with carbon dioxide, the analyzer is set to indicate the percentage of oxygen in the mixture. If substantial air is still in the generator, signal 21 so indicates but if there is no danger signal, filling with hydrogen may proceed.

The valves are now set as shown in FIG. 2. The positions of valves 7 and 8 are reversed and the positions of three-way valves 11, 14 are likewise reversed so that hydrogen can be introduced from source 12 through conduit 5 to generator 1 and carbon dioxide plus any remaining residue of air can be forced out via conduit 4, to discharge line 6 and through sampling chamber 15. Analyzer 17 has been set as described above to give an indication on alarm 21 when the percentage oxygen rises above approximately 5%. It will be appreciated that curve 22 of the graph in FIG. 3 is appropriate in this case and that this limit could conceivably be raised to 6% and still result in a safe mixture when carbon dioxide is present in the generator 1.

After introduction of hydrogen is complete, percent oxygen having been measured all during this time, all of the valves 7, 8, 11, 14 may be closed and the normal monitoring systems relied upon to measure the purity of the hydrogen, or if desired, valve 6a in the vent line 6 may be closed and the probe 16 can thus continue to monitor for oxygen during operation of the generator.

When it is desired to purge the generator of hydrogen, the inert gas is again used as the intermediary to prevent mixing air with hydrogen. The valves are again set as shown in FIG. 1 and carbon dioxide from the pressurized source 9 enters through conduit 4, forcing hydrogen out through conduits 5, 6. In this case, however, the analyzer is first set to measure for the percentage oxygen and then as the purging of hydrogen is nearly complete, the analyzer is switched to test for percentage of hydrogen. FIG. 1 shows the analyzer set to test for hydrogen in the latter stage of purging.

To remove the inert gas from the machine, valve 11 may be reversed from the position shown in FIG. 1 and valve 7 opened to allow the gas to bleed off to the vent line 6. A separate compressed air supply line (not shown) feeding the casing interior may also be used to speed up the inert gas removal. After shutdown, the monitoring system may be left turned on to continue testing for hydrogen.

The operation of the modification shown in FIG. 4 will now be described. This arrangement removes the necessity for changing the gas selector on the analyzer, since continuous monitoring is provided. It will be noted that contacts 30 close when the percentage of hydrogen exceeds 4%. Likewise, the contacts 31 close when the percentage of oxygen exceeds 5%. It should be apparent that when both of these conditions are met, the mixture in the casing is such that its composition lies above and to the right of the "L-shaped" curve 22 and in the flammable or explosive zone. When this occurs, contacts 30, 31, are closed and alarm 21 will give an indication of danger.

If, on the other hand, the mixture is such that there is either less than 4% hydrogen or less than 5% oxygen, the alarm will not sound. Thus the modification of FIG. 4 provides continuous monitoring during changing gas in the generator.

It will be readily apparent that the permissible safe percentages may be set on analyzers 26, 27 to give an additional safety factor by setting them slightly below the aforementioned 4% or 5% figures. Thus when these figures are referred to, it will be understood that they may be reduced by a given safety factor to increase the reliability of the system.

Thus it will be appreciated that a reliable means is provided for minimizing the possibility of explosion during changing of gases in the generator. The use of a dual-gas analyzer to determine explosive mixtures of hydrogen and oxygen permits monitoring of the mixtures at changeover periods when the danger of human error or mechanical malfunction is most acute.

These and many other advantages will be apparent to those skilled in the art and while there has been described what is at present considered to be the preferred embodiment of the invention, it will be understood that still other modifications may be made and it is intended to cover in the appended claims all such modifications as fall within the true spirit and scope of this invention.

What I claim as new and desire to secure by Letters Patent of the United States is:

1. In a protective system for a gas-filled generator having a substantially gas-tight casing, first means for introducing an inert purging gas into said casing to displace air contained therein, and second means for introducing hydrogen into said casing for displacing the purging gas, the combination of gas analyzer means connected to sample the gas in the generator casing and including first indicating means to give a danger signal during air discharge when a percentage of hydrogen on the order of 4% by volume is exceeded and second indicating means to give a danger signal during inert gas discharge when a percentage of oxygen on the order of 5% by volume is exceeded.

2. In a protective system for a gas-filled generator having a substantially gas-tight casing, first means for introducing an inert purging gas into said casing to displace air contained therein, second means for introducing hydrogen into said casing for displacing the purging gas, the combination of first gas analyzer means sampling the gas in said casing and arranged to be actuated when a percentage of hydrogen by volume on the order of 4% is exceeded, second gas analyzer means sampling the exhausted mixture and arranged to be actuated when a percentage of oxygen by volume on the order of 5% is exceeded, and alarm means arranged to give a signal when both the first and second analyzer means are actuated, whereby a signal is given when both substantially 4% hydrogen and substantially 5% oxygen are exceeded in the exhausted mixture.

3. A gas-changing protective system for a gas-filled generator having a gas tight casing, comprising first means to introduce inert purging gas to said casing while discharging the air therein, second means for introducing hydrogen to said casing while discharging said purging gas, a common exhaust conduit receiving the discharged gases and venting to the atmosphere, and gas analyzer means connected to sample the mixture in the common exhaust conduit including first indicating means to give a danger signal during the introduction of the purging gas when a percentage of hydrogen on the order of 4% by volume is exceeded, and second indicating means to give a danger signal during introduction of the hydrogen to the casing when a percentage of oxygen on the order of 5% by volume is exceeded.

4. In a gas-changing protective system for a gas-filled generator having a substantially gas-tight casing, first means to introduce inert purging gas to said casing while discharging air therein, second means for introducing hydrogen to said casing while discharging said purging gas, and a common exhaust conduit receiving the discharged gases and venting to the atmosphere, the combination of first gas analyzer means connected to sample the mixture in the common exhaust conduit including first contacts arranged to close when a percentage of hydrogen on the order of 4% by volume is exceeded, second gas analyzer means connected to sample the mixture in the common exhaust conduit including second contacts arranged to close when a percentage of oxygen on the order of 5% by volume is exceeded, and alarm means arranged to be actuated when both the first and second contacts are closed, whereby the alarm means will give a danger signal when there is a flammable mixture of hydrogen and oxygen in the generator.

5. In a protective system for a gas-filled generator having a gas-tight casing, a source of inert purging gas under pressure, first conduit means communicating with said casing, a source of hydrogen under pressure, second conduit means communicating with said casing, a common exhaust conduit for venting gas to the atmosphere, first valve means to selectively connect said first conduit either to the source of purging gas or to the exhaust conduit, second valve means to selectively connect the second conduit either to the source of hydrogen or to the exhaust conduit, the combination of gas analyzer means connected to sample the mixture in the exhaust conduit including first indicating means to give a danger signal when a percentage of hydrogen on the order of 4% by volume is exceeded, second indicating means to give a danger signal when a percentage of oxygen on the order of 5% by volume is exceeded, and means to selectively put into operation the first and second indicating means.

6. A gas-changing protective system for a gas-filled generator having a gas-tight casing, comprising a source of inert purging gas under pressure, a source of hydrogen under pressure, first and second conduits arranged to communicate with the generator casing, a common exhaust conduit, first valve means to selectively connect said first conduit either to the source of purging gas or to the exhaust conduit, second valve means to selectively connect the second conduit either to the source of hydrogen or to the exhaust conduit, and gas analyzer means connected to sample the mixture in the exhaust conduit including first means for setting the analyzer to indicate the percentage of hydrogen by volume in the exhaust mixture and second means for setting the analyzer to indicate the percentage of oxygen by volume in the exhaust mixture, and alarm means arranged to be actuated at the first analyzer setting when substantially 4% hydrogen is exceeded and also arranged to be actuated at the second analyzer setting when substantially 5% of oxygen is exceeded.

7. A gas-changing protective system for a gas-filled generator having a gas-tight casing, comprising a source of inert purging gas under pressure, a source of hydrogen under pressure, first and second conduits arranged to communicate with the generator casing, a common exhaust conduit, first valve means to selectively connect said first conduit either to the source of purging gas or to the exhaust conduit, second valve means to selectively connect the second conduit either to the source of hydrogen or to the exhaust conduit, first and second gas analyzer means connected to sample the mixture in the exhaust conduit, said first gas analyzer means including first contacts arranged to close when substantially 4% of hydrogen by volume in the exhaust mixture is exceeded, said second gas analyzer means including second contacts arranged to close when substantially 5% of oxygen by volume is exceeded, and alarm means connected in series in said first and second contacts, whereby a danger signal is given when both 4% hydrogen and 5% oxygen are exceeded in the exhaust mixture.

8. A method for preventing explosive mixtures while filling the gas-tight casing of an electric machine with hydrogen, comprising the steps of removing air from the casing by introducing an inert gas thereinto, monitoring the mixture of exhaust gases issuing from the casing with first analyzer means arranged to give an indication of unacceptability when a percentage of hydrogen by volume on the order of 4% is exceeded, turning off the first analyzer means after the casing is substantially filled with inert gas and commencing to monitor the mixture of exhaust gases issuing from the casing with second analyzer means arranged to give an indication of unacceptability when a percentage of oxygen by volume on the order of 5% is exceeded, and removing the inert gas from the casing by introducing hydrogen thereinto until the casing is substantially filled with hydrogen while continuing to monitor with the second analyzer means.

9. A method for preventing explosive mixtures while removing hydrogen from the gas-tight casing of an electric machine, comprising the steps of removing the hydrogen from the casing by introducing an inert gas thereinto, monitoring the mixture of exhaust gases issuing from the casing with first analyzer means arranged to give an indication of unacceptability when a percentage of oxygen by volume on the order of 5% is exceeded, turning off the first analyzer means after the casing is substantially filled with inert gas and commencing to monitor the mixture of exhaust gases issuing from the casing with second analyzer means arranged to give an indication of unacceptability when a percentage of hydrogen by volume on the order of 4% is exceeded, and removing the inert gas from the casing by introducing air thereinto until the casing is substantially filled with air while continuing to monitor with the second analyzer means.

10. A method for preventing explosive mixtures while changing the gas in an electric machine with a substantially gas-tight casing using an inert gas for displacing the gas contained in said casing, comprising monitoring the exhaust gases removed from the casing simultaneously with first analyzer means arranged to be actuated when a percentage of hydrogen by volume on the order of 4% is exceeded, and second analyzer means arranged to be actuated when a percentage of oxygen by volume on the order of 5% is exceeded, whereby actuation of both the first and second analyzer means indicates a flammable mixture.

11. A method for detecting explosive mixtures in an electric machine with a substantially gas-tight casing subjected to fillings of gas containing varying proportions of oxygen, hydrogen and inert gas, comprising monitoring the gas in the casing simultaneously with first analyzer means arranged to be actuated when a percentage of hydrogen by volume on the order of 4% is exceeded, and second analyzer means arranged to be actuated when a percentage of oxygen by volume on the order of 5% is exceeded, whereby actuation of both the first and second analyzer means indicates a flammable mixture.

References Cited in the file of this patent

UNITED STATES PATENTS

| | | |
|---|---|---|
| 1,559,182 | Rice | Oct. 27, 1925 |
| 1,778,834 | Penney | Oct. 21, 1930 |
| 2,307,754 | Beckwith | Jan. 12, 1943 |